(12) United States Patent
Kang et al.

(10) Patent No.: US 10,261,363 B2
(45) Date of Patent: Apr. 16, 2019

(54) OPTICAL COMPENSATION FILM FOR LIQUID CRYSTAL DISPLAY AND LIQUID CRYSTAL DISPLAY INCLUDING THE SAME

(71) Applicant: SHENZHEN CHINA STAR OPTOELECTRONICS TECHNOLOGY CO., LTD., Shenzhen, Guangdong (CN)

(72) Inventors: Chih-Tsung Kang, Shenzhen (CN); Bo Hai, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/241,427

(22) PCT Filed: Jan. 21, 2014

(86) PCT No.: PCT/CN2014/071002
§ 371 (c)(1),
(2) Date: Feb. 26, 2014

(87) PCT Pub. No.: WO2015/018187
PCT Pub. Date: Feb. 12, 2015

(65) Prior Publication Data
US 2015/0277175 A1    Oct. 1, 2015

(30) Foreign Application Priority Data
Aug. 9, 2013  (CN) .......................... 2013 1 0349469

(51) Int. Cl.
*G02F 1/13363*      (2006.01)
(52) U.S. Cl.
CPC .... *G02F 1/13363* (2013.01); *G02F 1/133634* (2013.01); *G02F 2001/133638* (2013.01);
(Continued)

(58) Field of Classification Search
CPC combination set(s) only.
See application file for complete search history.

(56) References Cited

U.S. PATENT DOCUMENTS

| 7,738,063 B2 * | 6/2010 | Jeon et al. ..................... 349/117 |
| 2005/0014913 A1 * | 1/2005 | Kim et al. ....................... 526/90 |

(Continued)

FOREIGN PATENT DOCUMENTS

| CN | 1764867 A | 4/2006 |
| CN | 1860404 A | 11/2006 |

(Continued)

OTHER PUBLICATIONS

International Search Report dated May 14, 2014 in corresponding application PCT/CN2014/071002.

*Primary Examiner* — Anthony J Frost
(74) *Attorney, Agent, or Firm* — Andrew C. Cheng

(57) ABSTRACT

The present disclosure proposes an optical compensation film for a liquid crystal display, including a first C-plate arranged on one side of a liquid crystal panel, a first polyvinyl alcohol layer arranged outside the first C-plate, a second C-plate arranged on the other side of the liquid crystal panel, an A-plate arranged outside the second C-plate and a second polyvinyl alcohol layer arranged outside the A-plate, wherein the in-plane compensation value for optical path difference of the A-plate lies in the range of [92, 184] nm, the compensation value for optical path difference in the thickness direction of the A-plate lies in the range of [46, 92] nm. The present disclosure also proposes a liquid crystal display including the above-mentioned optical compensation film for reducing light leakage and increasing contrast.

7 Claims, 6 Drawing Sheets

(52) U.S. Cl.
CPC ...... *G02F 2413/03* (2013.01); *G02F 2413/05* (2013.01); *G02F 2413/06* (2013.01); *G02F 2413/11* (2013.01); *Y10T 428/10* (2015.01); *Y10T 428/1036* (2015.01)

(56) References Cited

U.S. PATENT DOCUMENTS

| | | | |
|---|---|---|---|
| 2006/0132686 A1* | 6/2006 | Jeon et al. | 349/117 |
| 2008/0284948 A1* | 11/2008 | Koishi | G02B 5/3083 349/96 |
| 2010/0271573 A1* | 10/2010 | Sakai | G02F 1/13363 349/96 |

FOREIGN PATENT DOCUMENTS

| | | |
|---|---|---|
| CN | 102854659 A | 1/2013 |
| CN | 103439829 A | 12/2013 |
| JP | 2010224012 A | 10/2010 |
| KR | 101040641 B1 | 6/2011 |

\* cited by examiner

OPTICAL COMPENSATION FILM FOR LIQUID CRYSTAL DISPLAY AND LIQUID CRYSTAL DISPLAY INCLUDING THE SAME

FIELD OF THE INVENTION

The present disclosure relates to the technical field of liquid crystal display, and particularly, relates to an optical compensation film for a liquid crystal display and the liquid crystal display including the same.

BACKGROUND OF THE INVENTION

The contrast ratio of a liquid crystal display, directly related with its adaptability, significantly affects how it would be accepted by the market. The contrast ratio is a ratio of the luminance of the brightest color (white) to that of the darkest color (black) of the display. Generally, the insufficient dark state is a main factor limiting the contrast ratio of the liquid crystal display. With the increase of a viewing angle of a thin film transistor-liquid crystal display (TFT-LCD), the contrast ratio of pictures is continually reduced, and the sharpness of the pictures also correspondingly declines. This is due to the fact that the birefringence of liquid crystal molecules in a liquid crystal layer is changed along with the viewing angle. With a compensation achieved by adopting a wide-view compensation film, light leakage of dark-state pictures can be effectively reduced, and the contrast ratio of the pictures can be greatly improved within a certain viewing angle. Generally, the compensation film functions based on the principle that it offsets the phase difference generated by a liquid crystal under different viewing angles, so as to symmetrically compensate the birefringence performance of the liquid crystal molecules.

The compensation film adopted should be differentiated regarding different liquid crystal display modes, and the compensation film used in a large-sized liquid crystal television mostly aims at a vertical alignment (VA) display mode.

As the compensation value of the compensation film varies, the status of dark-state light leakage under a large viewing angle also varies, and thus the contrast ratio differs within the same length of optical path difference (LCΔNd) of a liquid crystal.

For example, FIG. 1 shows a corresponding diagram of dark-state light leakage distribution in the prior art when the optical path difference in liquid crystal (LCΔNd) is 333.5 nm, and FIG. 2 shows a diagram of full-view contrast ratio distribution. In FIG. 1 and FIG. 2, the optical path differences in liquid crystal, the pre-tilt angles of the liquid crystal and the compensation values of an A-plate and a C-plate are shown in table 1.

TABLE 1

| optical path difference in liquid crystal | pre-tilt angle of liquid crystal | in-plane compensation value $R_o$ for optical path difference of A-plate | compensation value $R_{th}$ for optical path difference in the thickness direction of A-plate | compensation value $R_{th}$ for optical path difference in the thickness direction of C-plate |
|---|---|---|---|---|
| 333.5 nm | 89 degrees | 109 nm | 55 nm | 403 nm |

Thus it could be seen that when A-plate and C-plate compensation values in the prior art are adopted, a serious light leakage phenomenon will be observed when viewing is taken in a dark state under a large angle. Therefore, the contrast ratio is lowered, and the range of the viewing angle is reduced. As a result, the sharpness of images would be greatly affected under some viewing angles.

SUMMARY OF THE INVENTION

Aiming at improving the effect for reducing light leakage using a compensation film on a liquid crystal display, the present disclosure proposes an optical compensation film for a liquid crystal display, for reducing light leakage and increasing contrast.

Through research, inventors find that the compensation values of a first C-plate, a second C-plate and an A-plate in the compensation film are directly related to the effect for reducing light leakage by the compensation film, wherein a better effect for reducing light leakage can be obtained though the in-plane compensation value $(r_o)$ for optical path difference of the A-plate, the compensation value for optical path difference in the thickness direction $(r_{th})$ of the A-plate and the compensation value for optical path difference in the thickness direction $(r_{th})$ of each C-plate in the compensation film in respective specific ranges and in cooperation with one another.

Accordingly, the present disclosure proposes an optical compensation film for a liquid crystal display. In embodiment 1, the compensation film includes a first C-plate arranged on one side of a liquid crystal panel, a first polyvinyl alcohol layer arranged outside the first C-plate, a second C-plate arranged on the other side of the liquid crystal panel, an A-plate arranged outside the second C-plate and a second polyvinyl alcohol layer arranged outside the A-plate, wherein the in-plane compensation value for optical path difference of the A-plate lies in the range of [92, 184] nm, the compensation value for optical path difference in the thickness direction of the A-plate lies in the range of [46, 92] nm, the compensation values for optical path difference in the thickness direction of the first C-plate and the second C-plate lie in a range of $[Y_1, Y_2]$ nm, $Y_1 = 0.0000413x^4 - 0.011434x^3 + 1.2037x^2 - 57.163x + 1125.75$, and $Y_2 = -0.00003236x^4 + 0.0088525x^3 - 0.9142x^2 + 42.2422x - 590.59$, wherein x is the compensation value for optical path difference in the thickness direction of the A-plate.

In embodiment 2 improved according to embodiment 1, the slow axis of the first C-plate is vertical to the absorption axis of the first polyvinyl alcohol layer.

In embodiment 3 improved according to embodiment 1 or 2, the slow axes of the A-plate and the second C-plate are both vertical to the absorption axis of the second polyvinyl alcohol layer.

In embodiment 4 improved according to any of embodiments 1 to 3, relative to a plane of the optical compensation film, the absorption axis of the first polyvinyl alcohol layer is 0 degree, the slow axis of the first C-plate is 90 degrees, the slow axis of the second C-plate is 0 degree, the slow axis of the A-plate is 0 degree, and the absorption axis of the second polyvinyl alcohol layer is 90 degrees.

In embodiment 5 improved according to any of embodiments 1 to 3, relative to a plane of the optical compensation film, the absorption axis of the first polyvinyl alcohol layer is 90 degree, the slow axis of the first C-plate is 0 degrees, the slow axis of the second C-plate is 90 degree, the slow axis of the A-plate is 90 degree, and the absorption axis of the second polyvinyl alcohol layer is 0 degrees.

In embodiment 6 improved according to any of embodiments 1 to 5, the sum of the compensation values for optical path difference in the thickness direction of the first C-plate and the second C-plate is greater than the in-plane compensation value for optical path difference of the A-plate In embodiment 7 improved according to any of embodiments 1 to 6, the optical path difference in liquid crystal of the liquid crystal panel lies in the range of [324.3, 342.8] nm, and pre-tilt angle of the liquid crystal of the liquid crystal panel lies in the range of [85°, 89°].

The present disclosure also proposes a liquid crystal display including the above-mentioned optical compensation film, wherein the optical compensation film includes:

a first C-plate arranged on one side of a liquid crystal panel, a first polyvinyl alcohol layer arranged outside the first C-plate, a second C-plate arranged on the other side of the liquid crystal panel, an A-plate arranged outside the second C-plate and a second polyvinyl alcohol layer arranged outside the A-plate, wherein the in-plane compensation value for optical path difference of the A-plate lies in the range of [92, 184] nm, the compensation value for optical path difference in the thickness direction of the A-plate lies in the range of [46, 92] nm, the compensation values for optical path difference in the thickness direction of the first C-plate and the second C-plate lie in a range of $[Y_1, Y_2]$ nm, $Y_1=0.0000413x^4-0.011434x^3+1.2037x^2-57.163x+1125.75$, and $Y_2=-0.00003236x^4+0.0088525x^3-0.9142x^2+42.2422x-590.59$, wherein x is the compensation value for optical path difference in the thickness direction of the A-plate.

In an example of the display, the slow axis of the first C-plate is vertical to the absorption axis of the first polyvinyl alcohol layer, and the slow axes of the A-plate and the second C-plate are both vertical to the absorption axis of the second polyvinyl alcohol layer.

In an example of the display, the sum of the compensation values for optical path difference in the thickness direction of the first C-plate and the second C-plate is greater than the in-plane compensation value for optical path difference of the A-plate.

Certain changes can be made to the embodiment as long as the A-plate and the C-plates are within the compensation value ranges in the technical solutions of the present disclosure. In this way, the light leakage distribution can be greatly reduced, and the present disclosure has significant advantages compared with the prior art.

The above-mentioned technical features may be combined in various appropriate manners or substituted by equivalent technical features, as long as the objective of the present disclosure can be fulfilled.

BRIEF DESCRIPTION OF THE DRAWINGS

The present disclosure will be described in more detail below based on merely nonfinite examples with reference to the accompanying drawings. Wherein.

Figure 1:
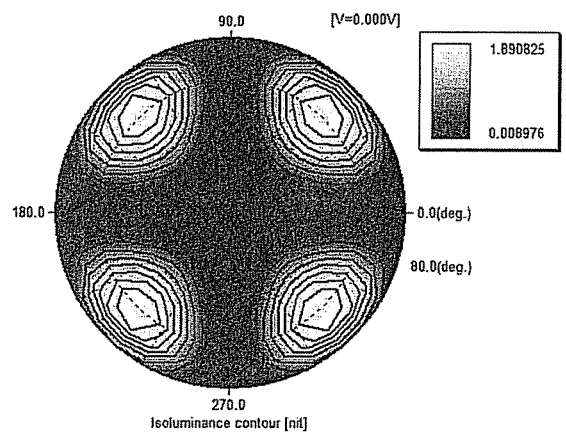
FIG. 1 shows a diagram of dark-state light leakage distribution with the A-plate and C-plate adopting the compensation values in the prior art mentioned in the background of the invention.

In the drawings, the same components are indicated by the same reference signs. The accompanying drawings are not drawn in an actual scale.

DETAILED DESCRIPTION OF THE EMBODIMENTS

The present disclosure will be introduced in detail below with reference to the accompanying drawings.

Figure 3:
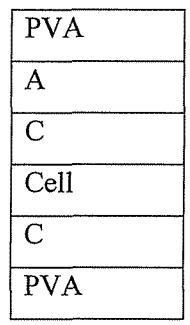
FIG. 3 schematically shows structure of an optical compensation film for a liquid crystal display according to the present disclosure.

With reference to FIG. 3, an optical compensation film for a liquid crystal display according to the present disclosure includes a first C-plate arranged on one side of a liquid crystal panel, a first polyvinyl alcohol layer arranged outside the first C-plate, a second C-plate arranged on the other side of the liquid crystal panel, an A-plate arranged outside the second C-plate, and a second polyvinyl alcohol layer arranged outside the A-plate.

The optical compensation film according to the present disclosure may adopt one of the following two kinds of structures.

Relative to a plane of the optical compensation film, in the optical compensation film according to the present disclosure, the absorption axis of an upper polarizer is 0 degree, and the absorption axis of a lower polarizer is 90 degrees (Compensation structure 1).

| Compensation structure 1 | angle |
|---|---|
| PVA | absorption axis being 0 degree |
| C | slow axis being 90 degrees |
| liquid crystal panel (Cell) | |
| C | slow axis being 0 degree |
| A | slow axis being 0 degree |
| PVA | absorption axis being 90 degrees |

However, when the absorption axis of the upper polarizer is 90 degrees and the absorption axis of the lower polarizer is 0 degree relative to a plane of the optical compensation film, the present disclosure is still applicable if only the slow axes of the A-plate and the C-plate of the compensation structure are vertical to the absorption axis of the polyvinyl alcohol (PVA) layer which is on the same side of the liquid crystal panel (cell) as the A-plate or the C-plate. (Compensation structure 2)

| Compensation structure 2 | angle |
|---|---|
| PVA | absorption axis being 0 degree |
| A | slow axis being 90 degrees |
| C | slow axis being 90 degrees |
| liquid crystal panel (Cell) | |
| C | slow axis being 0 degree |
| PVA | absorption axis being 90 degrees |

The inventors discover that the compensation structures 1 and 2 are equivalent to each other during simulation. Namely, under the same compensation value, the maximum dark-state light leakage corresponding to each of the compensation structures 1 and 2 is the same.

Aiming at the above compensation structures, the inventors discover that the compensation values (in-plane compensation value for optical path difference and compensation value for optical path difference in the thickness direction) of the A-plate and the C-plate are related with the effect for reducing dark-state light leakage by the optical compensation film. For this reason, different compensation values of the A-plate and the C-plate can be used together to simulate the dark-state light leakage, and thus an optimal compensation value range can be found for corresponding dark-state light leakage as required.

The simulation adopts the following settings.

For the optical compensation film, the structure of the set optical compensation film for the liquid crystal display is shown in FIG. 3. Specifically, the film includes a first C-plate arranged on one side of a liquid crystal panel, a first polyvinyl alcohol layer arranged outside the first C-plate, a second C-plate arranged on the other side of the liquid crystal panel, an A-plate arranged outside the second C-plate, and a second polyvinyl alcohol layer arranged outside the A-plate. The slow axes of the A-plate and the C-plate are vertical to the absorption axis of the polyvinyl alcohol layer on the same side of the liquid crystal panel (cell) as the A-plate or the C-plate respectively.

For the liquid crystal, the pre-tilt angle lies in the range of [85°, 90°) (four-domain liquid crystal tilt angles are 45°), and the liquid crystal optical path difference lies in the range of [324.3, 342.8] nm.

For the light source, blue light excited yttrium aluminum garnet fluorescent powder (Blue-YAG) LED spectra are used with the center brightness set as 100 nits, and Lambert's distribution is adopted for light source distribution.

With the above-mentioned settings, the dark-state light leakage condition is simulated for using different compensation values of the A-plate and the C-plates together.

The optical path difference in liquid crystal is selected as 324.3 nm and 342.8 nm, and the pre-tilt angle is selected as 85° and 89° respectively.

Figure 4:
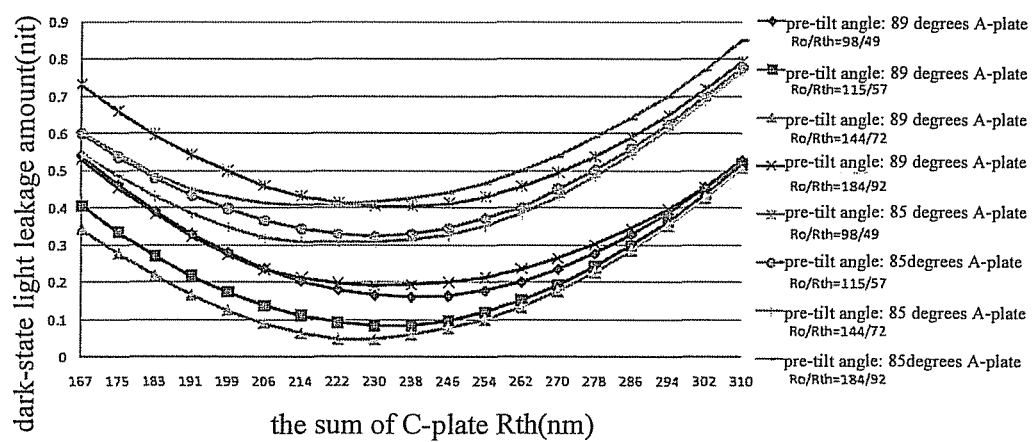
FIG. 4 shows a trend of a maximum amount of dark-state light leakage as a function of the compensation values under different pre-tilt angles when the optical path difference in liquid crystal is 324.3 nm.
Figure 5:
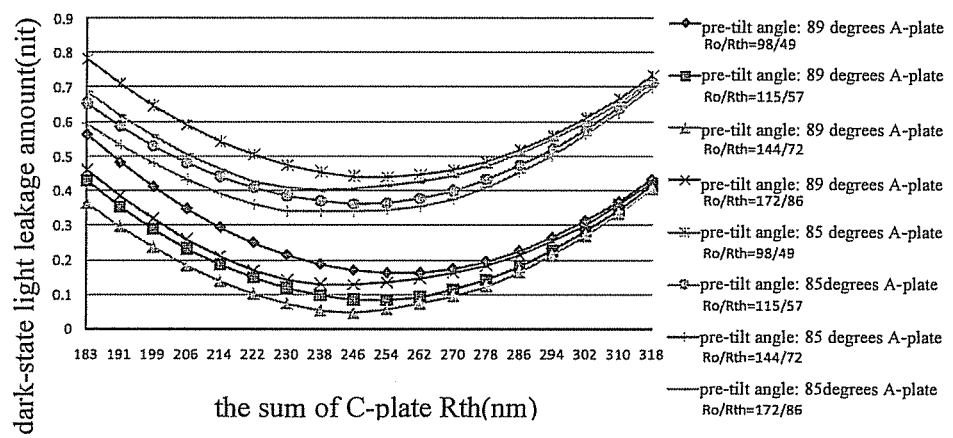
FIG. 5 shows a trend of a maximum amount of dark-state light leakage as a function of the compensation values under different pre-tilt angles when the optical path difference in liquid crystal is 342.8 nm.

FIG. 4 shows a trend of a maximum amount of dark-state light leakage as a function of the compensation values under different pre-tilt angles when the optical path difference in liquid crystal is 324.3 nm. FIG. 5 shows a trend of a maximum amount of dark-state light leakage as a function of the compensation values under different pre-tilt angles when the optical path difference in liquid crystal is 342.8 nm.

In FIG. 4 and FIG. 5, different compensation values of A-plate and C-plate are used together for simulation with varied optical path differences in liquid crystal and pre-tilt angles respectively. It could be seen that the influence of the compensation values of A-plate and C-plate on dark-state light leakage tends to be consistent under different pre-tilt angles. Namely, the corresponding compensation value ranges within which the dark-state light leakage can be minimized are identical under different pre-tilt angles.

Thus, the optimal ranges of A-plate and C-plate compensation values in the optical compensation film can be obtained when the optical path difference in liquid crystal lies in the range of [324.3, 342.8] nm with the pre-tilt angle in the range of [85°-90°) and the dark-state light leakage below 0.2 nit.

TABLE 2

| optical path difference (nm) in liquid crystal | in-plane compensation value $R_o$(nm) for the optical path difference of A-plate | compensation value $R_{th}$(nm) for the optical path difference in the thickness direction of A-plate | compensation value $R_{th}$(nm) for the optical path difference in the thickness direction of C-plate |
|---|---|---|---|
| [324.3, 342.8]nm | [92, 184]nm | [46, 92]nm | [$Y_1$, $Y_2$]nm |

Wherein, $Y_1 = 0.0000413x^4 - 0.011434x^3 + 1.2037x^2 - 57.163x + 1125.75$, $Y_2 = -0.00003236x^4 + 0.0088525x^3 - 0.9142x^2 + 42.2422x - 590.59$, and x is the compensation value for optical path difference in the thickness direction ($R_{th}$) of the A-plate.

Namely, when the optical path difference in liquid crystal lies in the range of [324.3, 342.8] nm and the pre-tilt angle lies in the range of [85°-90°), the ideal dark-state light leakage reducing effect may be achieved by compatibly using the compensation values of the A-plate and the C-plates of different optical compensation film structures. The range of optimal compensation values is mentioned above, as shown in Table 2.

Once the appropriate range for compensation value is found and the in-plane compensation value for optical path difference ($R_o$) is known, the relationship among the compensation value for optical path difference ($R_{th}$) in the thickness direction, the refractive index N and the thickness d can be determined as follows:

$$R_o = (N_x - N_y) * d$$

$$R_{th}[(N_x + N_y)/2 - N_z] * d$$

wherein x and y represent in-plane directions perpendicular to each other, and z represents the thickness direction.

Thus, the compensation values may be adjusted with the following three methods.

Method a): The refractive indexes N of the conventional A-plate and C-plates stay unchanged, while the compensation values are adjusted by changing the thickness d.

Method b): Based on the conventional A-plate and C-plates, the compensation values are adjusted by changing the refractive indexes N.

Method c): The compensation values are adjusted by changing the thickness d and the refractive indexes N at the same time, while the compensation values of the A-plate and the C-plates are maintained within the ranges.

Corresponding to the optical compensation film proposed in the present disclosure, three examples as following are provided for comparison with the example in prior art as mentioned in the background portion.

Figure 2:
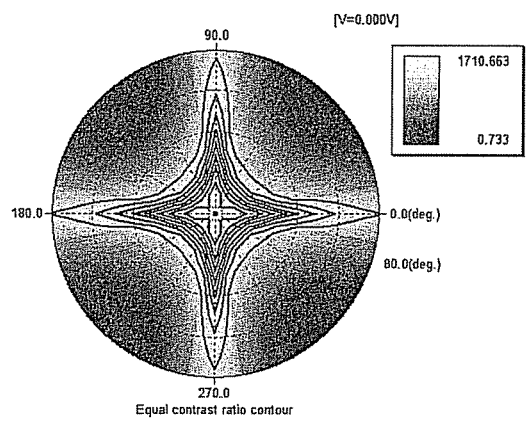
FIG. 2 shows a diagram for full-view contrast distribution with the A-plate and C-plate adopting the compensation values in the prior art mentioned in the background of the invention.

For comparison with the effects of the optical compensation film in the prior art shown in FIG. 1 and FIG. 2, dark-state light leakage and full-view contrast distribution are compared with changing the compensation values of the A-plate and the C-plates in the optical compensation film according to the present disclosure.

3 groups of in-plane compensation values for optical path difference $R_o$ and compensation values $R_{th}$ for optical path difference in the thickness direction of the A-plate and the C-plates are selected.

EXAMPLE 1

| optical path difference in liquid crystal | pre-tilt angle of liquid crystal | A-plate $R_o$ | A-plate $R_{th}$ | the sum of C-plate $R_{th}$ |
|---|---|---|---|---|
| 333.5 nm | 89 degrees | 144 nm | 72 nm | 195 nm |

Figure 6:
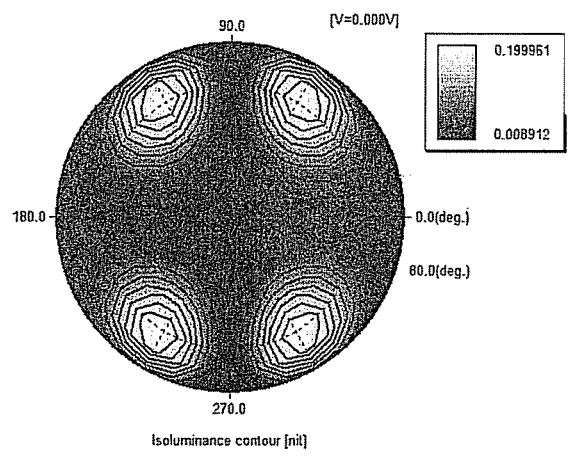
FIG. 6 shows a diagram for dark-state full-view light leakage distribution in a first example of the present disclosure.
Figure 7:
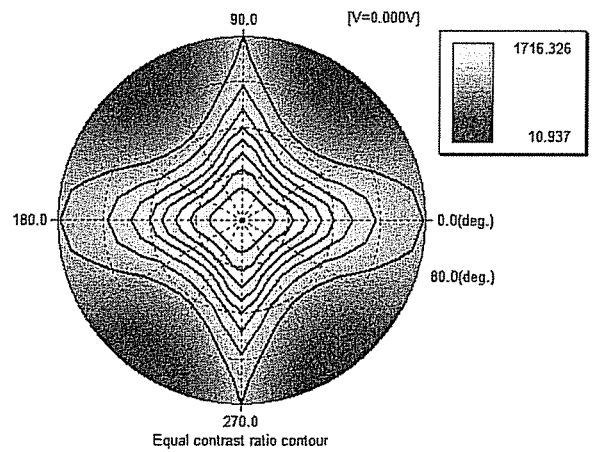
FIG. 7 shows a diagram for full-view contrast distribution in the first example of the present disclosure.

FIG. 6 shows a diagram of dark-state full-view light leakage distribution in Example 1, and FIG. 7 shows a diagram of full-view contrast distribution in Example 1.

EXAMPLE 2

| optical path difference in liquid crystal | pre-tilt angle of the liquid crystal | A-plate $R_o$ | A-plate $R_{th}$ | the sum of C-plate $R_{th}$ |
|---|---|---|---|---|
| 333.5 nm | 89 degrees | 144 nm | 72 nm | 230 nm |

Figure 8:
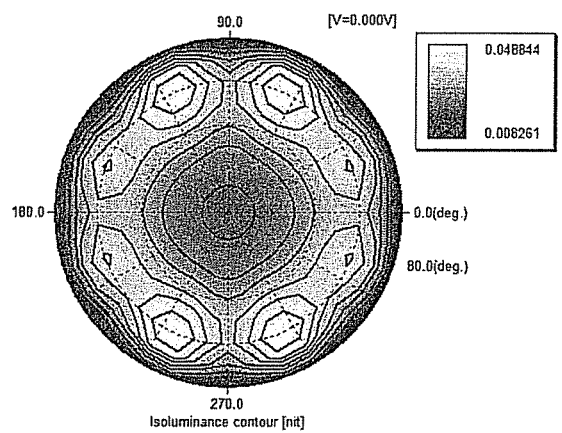
FIG. 8 shows a diagram for dark-state full-view light leakage distribution in a second example of the present disclosure.
Figure 9:
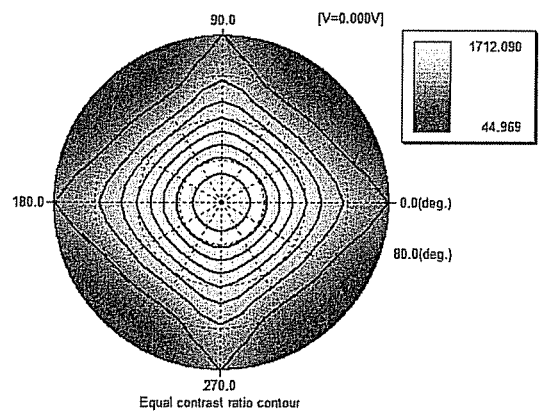
FIG. 9 shows a diagram for full-view contrast distribution in the second example of the present disclosure.

FIG. 8 shows a diagram of dark-state full-view light leakage distribution in Example 2, and FIG. 9 shows a diagram of full-view contrast distribution in Example 2.

EXAMPLE 3

| optical path difference in liquid crystal | pre-tilt angle of the liquid crystal | A-plate $R_o$ | A-plate $R_{th}$ | the sum of C-plate $R_{th}$ |
|---|---|---|---|---|
| 333.5 nm | 89 degrees | 144 nm | 72 nm | 282 nm |

Figure 10:
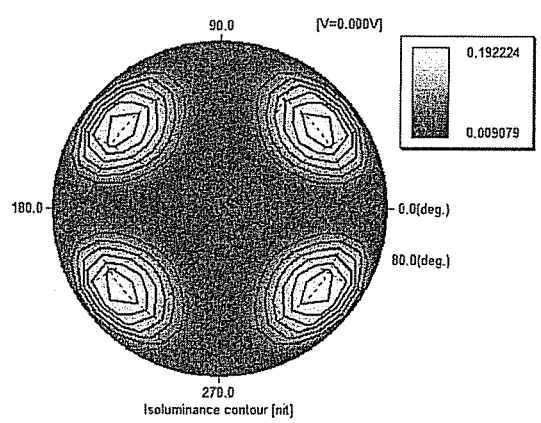
FIG. 10 shows a diagram for dark-state full-view light leakage distribution in a third example of the present disclosure.
Figure 11:
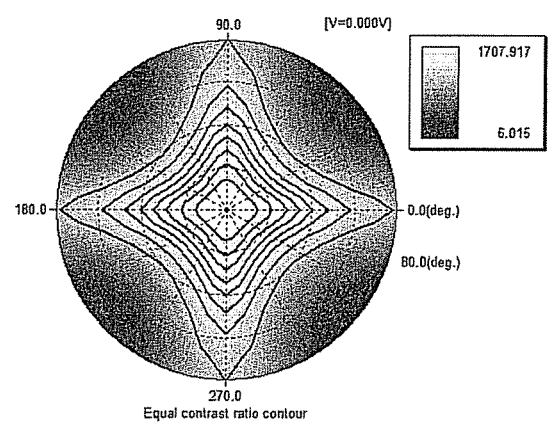
FIG. 11 shows a diagram for full-view contrast distribution in the third example of the present disclosure.

FIG. 10 shows a diagram of dark-state full-view light leakage distribution in Example 3, and FIG. 11 shows a diagram of full-view contrast distribution in Example 3.

In FIG. 6 to FIG. 11:

| | maximum light leakage (nit) | minimum light leakage (nit) | maximum contrast | minimum contrast |
|---|---|---|---|---|
| Comparative example | 1.890825 | 0.008976 | 1710.663 | 0.733 |
| Example 1: | 0.199961 | 0.008912 | 1716.326 | 10.937 |
| Example 2 | 0.048844 | 0.008261 | 1712.090 | 44.969 |
| Example 3 | 0.192224 | 0.009079 | 1707.917 | 6.015 |

By comparing FIG. 6, FIG. 8 and FIG. 10 corresponding to Example 1, Example 2 and Example 3 respectively with FIG. 1, it could be found that after the compensation values of the A-plate and the C-plates of the optical compensation film are adjusted, the maximum dark-state light leakage is reduced from 1.89 nits to 0.2 nit or below, which is far lower than the dark-state light leakage obtained with the optical compensation film in the prior art.

By comparing FIG. 7, FIG. 9 and FIG. 11 corresponding to Example 1, Example 2 and Example 3 respectively with FIG. 2, it could be found that after the compensation values of the A-plate and the C-plates of the optical compensation film are adjusted, the full-view contrast distribution is far better than that obtained with the optical compensation film in the prior art.

The present disclosure also proposes a liquid crystal display including the above-mentioned optical compensation film.

Although the present disclosure has been described with reference to the preferred examples, various modifications could be made to the present disclosure without departing from the scope of the present disclosure and components in the present disclosure could be substituted by equivalents. The present disclosure is not limited to the specific examples disclosed in the description, but includes all technical solutions falling into the scope of the claims.

The invention claimed is:

1. An optical compensation film for a liquid crystal display, including only one first C-plate arranged on one side of a liquid crystal panel, a first polyvinyl alcohol layer arranged outside the first C-plate, only one second C-plate arranged on the other side of the liquid crystal panel, only one A-plate arranged outside the second C-plate, and a second polyvinyl alcohol layer arranged outside the A-plate, wherein the in-plane compensation value for optical path difference of the A-plate is 184 nm, the compensation value for optical path difference in the thickness direction of the A-plate is 72 nm, and the compensation values for optical path difference in the thickness direction of the first C-plate and the second C-plate lie in a range of $[Y_1, Y_2]$ nm, in which $Y_1=0.0000413x^4-0.011434x^3+1.2037x^2-57.163x+1125.75$, $Y_2=-0.00003236x^4+0.0088525x^3-0.9142x^2+42.2422x-590.59$, and x is the compensation value for optical path difference in the thickness direction of the A-plate, wherein the slow axis of the first C-plate is vertical to the absorption axis of the first polyvinyl alcohol layer, and the slow axes of the A-plate and the second C-plate are both vertical to the absorption axis of the second polyvinyl alcohol layer.

2. The optical compensation film according to claim 1, wherein relative to a plane of the optical compensation film, the absorption axis of the first polyvinyl alcohol layer is 0 degree, the slow axis of the first C-plate is 90 degrees, the slow axis of the second C-plate is 0 degree, the slow axis of the A-plate is 0 degree, and the absorption axis of the second polyvinyl alcohol layer is 90 degrees.

3. The optical compensation film according to claim 1, wherein relative to a plane of the optical compensation film, the absorption axis of the first polyvinyl alcohol layer is 90 degree, the slow axis of the first C-plate is 0 degrees, the slow axis of the second C-plate is 90 degree, the slow axis of the A-plate is 90 degree, and the absorption axis of the second polyvinyl alcohol layer is 0 degrees.

4. The optical compensation film according to claim 1, wherein the sum of the compensation values for optical path difference in the thickness direction of the first C-plate and the second C-plate is greater than the in-plane compensation value for optical path difference of the A-plate.

5. The optical compensation film according to claim 1, wherein the optical path difference in liquid crystal of the liquid crystal panel lies in the range of [324.3, 342.8] nm, and the pre-tilt angle of the liquid crystal of the liquid crystal panel lies in the range of [85.degree., 89.degree].

6. A liquid crystal display including an optical compensation film, wherein the optical compensation film includes:
   only one first C-plate arranged on one side of a liquid crystal panel, a first polyvinyl alcohol layer arranged outside the first C-plate, only one second C-plate arranged on the other side of the liquid crystal panel, only one A-plate arranged outside the second C-plate, and a second polyvinyl alcohol layer arranged outside the A-plate,
   wherein the in-plane compensation value for optical path difference of the A-plate is 184 nm,
   the compensation value for optical path difference in the thickness direction of the A-plate is 72 nm, and
   the compensation values for optical path difference in the thickness direction of the first C-plate and the second C-plate lie in a range of $[Y_1, Y_2]$ nm, in which $Y_1=0.0000413x^4-0.011434x^3+1.2037x^2-57.163x+1125.75$, $Y_2=-0.00003236x^4+0.0088525x^3-0.9142x^2+42.2422x-590.59$, and x is the compensation value for optical path difference in the thickness direction of the A-plate, and
   wherein the slow axis of the first C-plate is vertical to the absorption axis of the first polyvinyl alcohol layer, and the slow axes of the A-plate and the second C-plate are both vertical to the absorption axis of the second polyvinyl alcohol layer.

7. The liquid crystal display according to claim 6, wherein the sum of the compensation values for optical path difference in the thickness direction of the first C-plate and the second C-plate is greater than the in-plane compensation value for optical path difference of the A-plate.

* * * * *